(12) United States Patent
Gui (10) Patent No.: US 11,190,250 B2
(45) Date of Patent: Nov. 30, 2021

(54) SYSTEM AND METHOD FOR ENHANCING AN AEROSPACE COVERAGE CAPABILITY OF A MOBILE COMMUNICATION BASE STATION

(71) Applicant: iShareCloud Technology Co., Ltd., Shenzhen (CN)

(72) Inventor: Yongsheng Gui, Shenzhen (CN)

(73) Assignee: iShareCloud Technology Co., Ltd., Shenzhen (CN)

(*) Notice: Subject to any disclaimer, the term of this patent is extended or adjusted under 35 U.S.C. 154(b) by 71 days.

(21) Appl. No.: 16/753,348

(22) PCT Filed: Sep. 9, 2019

(86) PCT No.: PCT/CN2019/104875
§ 371 (c)(1),
(2) Date: Apr. 3, 2020

(87) PCT Pub. No.: WO2020/088100
PCT Pub. Date: May 7, 2020

(65) Prior Publication Data
US 2021/0297127 A1    Sep. 23, 2021

(30) Foreign Application Priority Data
Oct. 31, 2018    (CN) .......................... 201811286566.X (51) Int. Cl.
*H04B 7/06* (2006.01)
*H04B 7/0408* (2017.01)
(Continued)

(52) U.S. Cl.
CPC ......... *H04B 7/0617* (2013.01); *H04B 1/0064* (2013.01); *H04B 7/0408* (2013.01); *H04B 7/18506* (2013.01); *H04W 16/28* (2013.01)

(58) Field of Classification Search
CPC .... H04B 1/005; H04B 1/0064; H04B 1/0067; H04B 1/38; H04B 1/40; H04B 1/405;
(Continued)

(56) References Cited

U.S. PATENT DOCUMENTS

| 7,103,383 B2 | 9/2006 | Ito |
| 2010/0149061 A1* | 6/2010 | Haziza ............... H01Q 13/0233 343/779 |

(Continued)

FOREIGN PATENT DOCUMENTS

| CN | 1688170 A | 10/2005 |
| CN | 201118583 Y | 9/2008 |

(Continued)

OTHER PUBLICATIONS

Marco Giordani, et al. Standalone and Non-Standalone Beam Management for 3GPP NR at mmWaves, IEEE Communications Magazine, 2019, pp. 123-129, 57(4).

*Primary Examiner* — Young T. Tse
(74) *Attorney, Agent, or Firm* — Bayramoglu Law Offices LLC (57) ABSTRACT

A system and method for enhancing an aerospace coverage capability of a mobile communication base station includes a baseband processing unit, a remote radio unit and a full-airspace array antenna. The full-airspace array antenna includes a conversion channel module, an interface processing module, a digital beamforming module, a transceiver channel module and an antenna array. The baseband processing unit is connected to the remote radio unit, the remote radio unit is connected to the conversion channel module through a radio-frequency cable, and the conversion channel module is connected to the antenna array successively through the interface processing module, the digital beamforming module, and the transceiver channel module.

4 Claims, 5 Drawing Sheets (51) Int. Cl.
*H04B 7/185* (2006.01)
*H04W 16/28* (2009.01)
*H04B 1/00* (2006.01)

(58) Field of Classification Search
CPC .......... H04B 7/02; H04B 7/04; H04B 7/0404;
H04B 7/0408; H04B 7/0617; H04B
7/18506; H04W 16/28
USPC ....... 375/219, 220, 222, 260, 262, 265, 267,
375/349; 370/277, 278, 334, 336, 343;
455/84, 88, 553.1
See application file for complete search history.

(56) References Cited

U.S. PATENT DOCUMENTS

| | | | | |
|---|---|---|---|---|
| 2013/0322558 | A1* | 12/2013 | Harel | H04B 7/0634 |
| | | | | 375/267 |
| 2014/0016573 | A1* | 1/2014 | Nuggehalli | H04B 7/0617 |
| | | | | 370/329 |
| 2014/0369328 | A1 | 12/2014 | Park et al. | |
| 2015/0124688 | A1 | 5/2015 | Xu et al. | |
| 2016/0352002 | A1* | 12/2016 | Aue | H04B 7/0617 |
| 2017/0077602 | A1 | 3/2017 | Li et al. | |
| 2017/0238194 | A1* | 8/2017 | Ling | H04W 64/003 |
| | | | | 455/562.1 |
| 2018/0115342 | A1 | 4/2018 | Doane et al. | |
| 2021/0028850 | A1* | 1/2021 | Elliott | H04B 7/0695 |

FOREIGN PATENT DOCUMENTS

| | | |
|---|---|---|
| CN | 101359949 A | 2/2009 |
| CN | 102570064 A | 7/2012 |
| CN | 103476043 A | 12/2013 |
| CN | 103997352 A | 8/2014 |
| CN | 108711682 A | 10/2018 |
| CN | 109347492 A | 2/2019 |
| WO | 2018098634 A1 | 6/2018 |

* cited by examiner

SYSTEM AND METHOD FOR ENHANCING AN AEROSPACE COVERAGE CAPABILITY OF A MOBILE COMMUNICATION BASE STATION

CROSS REFERENCE TO THE RELATED APPLICATIONS

This application is the national phase entry of International Application No. PCT/CN2019/104875, filed on Sep. 9, 2019, which is based upon and claims priority to Chinese Patent Application No. 201811286566.X, filed on Oct. 31, 2018, the entire contents of which are incorporated herein by reference.

TECHNICAL FIELD

The present disclosure relates to mobile communications, and in particular, to a system and method for enhancing an aerospace coverage capability of a mobile communication base station.

BACKGROUND

Cellular mobile communication networks represented by the fourth generation (4G) of mobile phone mobile communication technology standards have been integrated into all aspects of life. Whether users are outdoors, indoors, on the cars, or on the trains, the user terminals can reliably access the networks to obtain high-bandwidth data transmission and stable voice services.

However, the coverage of cellular mobile communication networks is mainly on the ground at present. With the increase in various types of aerospace applications, there is an increased demand for aerospace users such as civil aircraft, drones and satellites to access the mobile communication networks. The existing cellular mobile communication base station mainly includes a baseband processing unit (BBU), a remote radio unit (RRU), and an antenna. The BBU completes baseband processing and is connected to the RRU. The RRU completes frequency conversion processing and is connected to the antenna through a radio-frequency cable. The antenna completes the radiation and reception of electromagnetic signals. However, such a base station architecture does not have a sufficient aerospace coverage capability.

SUMMARY

An objective of the present disclosure is to overcome the shortcomings of the prior art, and to provide a system and method for enhancing an aerospace coverage capability of a mobile communication base station. Based on the existing mobile communication base station, a full-airspace array antenna is appropriately configured to achieve the coverage of user terminals in the aerospace and effectively enhance the aerospace coverage capability of the mobile communication system.

The objective of the present disclosure is achieved by the following technical solutions: A system for enhancing aerospace coverage capability of a mobile communication base station includes a baseband processing unit, a remote radio unit, and a full-airspace array antenna.

The full-airspace array antenna includes a conversion channel module, an interface processing module, a digital beamforming module, a transceiver channel module, and an antenna array. The transceiver channel module includes a plurality of transceiver channels, and the antenna array includes a plurality of antenna array elements that are in a one-to-one correspondence with the plurality of transceiver channels.

The baseband processing unit is connected to the remote radio unit, the remote radio unit is connected to the conversion channel module through a radio-frequency cable, and the conversion channel module is connected to the digital beamforming module through the interface processing module.

The conversion channel module is configured to realize the conversion between a radio-frequency signal and a digital signal. The interface processing module is configured to complete data aggregation and transmission between the conversion channel module and the digital beamforming module. The digital beamforming module is configured to adjust amplitude and phase weighting coefficients of each transceiver channel to form transmitting beams covering a specific spatial domain, and the digital beamforming module is connected to a corresponding antenna array element through each transceiver channel.

Preferably, the morphology of the full-airspace array antenna includes, but is not limited to, a spherical shape, a hemispherical shape, a combination of a hemispherical shape and a cylindrical shape, a polyhedral shape, a smooth curved surface, and a mesh curved surface spliced by polygons.

A method for achieving aerospace coverage by the system for enhancing the aerospace coverage capability of the mobile communication base station, including a user access step, a user tracking step, and a user service step.

The user access step includes the following three modes:
first, in an external auxiliary access mode: when position information of a user is obtained in an external manner, forming a directional beam pointing to a direction of the user based on the position information of the user via the full-airspace array antenna to ensure reliable access of the user;
second, in a wide beam access mode: when the position information of the user is unavailable, reducing the number of array elements participating in the digital beamforming, to form a wide beam with a wider beam width to cover the user and achieve the reliable access of the user;
third, in a narrow beam access mode: when the number of the array elements participating in the digital beamforming is constant, forming a narrow beam with a narrower beam width to achieve beam scanning via the full-airspace array antenna, and forming narrow beams covering different beam positions at different times to achieve full-airspace scanning and random access of the user.

The user tracking step includes the following two modes:
first, in an angle tracking mode: using a multi-beam capability of the full-airspace array antenna to allocate a beam by the system, and adjusting a direction of the beam in real time based on angle tracking, to achieve tracking of the user, thereby ensuring stable service transmission of the user;
second, in an external auxiliary tracking mode: reporting position information of a user equipped with a satellite positioning receiver to the system during an access phase, wherein the system uses the position information to achieve beam-oriented tracking coverage.

The user service step includes the following two working modes:
first, in a single stream mode:
configuring the baseband processing unit and the remote radio unit to work in a single antenna mode, wherein at this time, the baseband processing unit processes a single data stream, and the remote radio unit works with only one channel; when transmitting, the full-airspace array antenna receives a single radio-frequency signal output by the remote radio unit, parses out a single baseband data stream, and forms a digital beam through digital beamforming to achieve the aerospace coverage; when receiving, the full-airspace array antenna forms a digital beam through the digital beamforming to achieve the aerospace coverage, receives a user signal, parses out a single baseband data stream, and restores the single baseband data stream into the radio-frequency signal and outputs the radio-frequency signal to the remote radio unit;

second, in a multi-stream mode:

configuring the baseband processing unit and the remote radio unit to work in a multi-antenna mode and realize multi-antenna space division multiplexing through codebook design; wherein at this time, the baseband processing unit simultaneously processes L data streams, and each data stream carries data of different users, data of the same user only exists in one data stream, and the remote radio unit simultaneously performs frequency conversion on L channels; when transmitting, the full-airspace array antenna receives L radio-frequency signals output by the remote radio unit and parses out L baseband data streams, and then forms L digital beams through digital beamforming, to realize the transmission of user data in L spatial domains; when receiving, the full-airspace array antenna forms L digital beams through digital beamforming to cover users in the L spatial domains, receives signals of the users, parses out L baseband data streams, and restores the L baseband data streams into L radio-frequency signals and outputs the L radio-frequency signals to the remote radio unit.

The advantages of the present disclosure are as follows. Based on the existing mobile communication base station, in the present disclosure, the full-airspace array antenna is appropriately configured to achieve the coverage of user terminals in a spatial domain, which effectively enhances the aerospace coverage capability of the mobile communication base station. In the full-airspace array antenna, the channel conversion module is configured to complete the conversion of radio-frequency signals and digital signals. Therefore, the full-airspace array antenna can be directly connected to the radio remote unit of the existing base station, which ensures the compatibility between the full-airspace array antenna and the remote radio unit of the existing base station. In the single stream mode of the present disclosure, the high-gain narrow beam and digital multi-beamforming technology are employed to extend the coverage of the system, and in the multi-stream mode, the multiple-antenna space division multiplexing is employed to increase the number of accessed users in the aerospace.

DETAILED DESCRIPTION OF THE EMBODIMENTS

The technical solution of the present disclosure will be further described in detail hereinafter with reference to the drawings, however, the scope of protection of the present disclosure is not limited to the following description.

Figure 1:
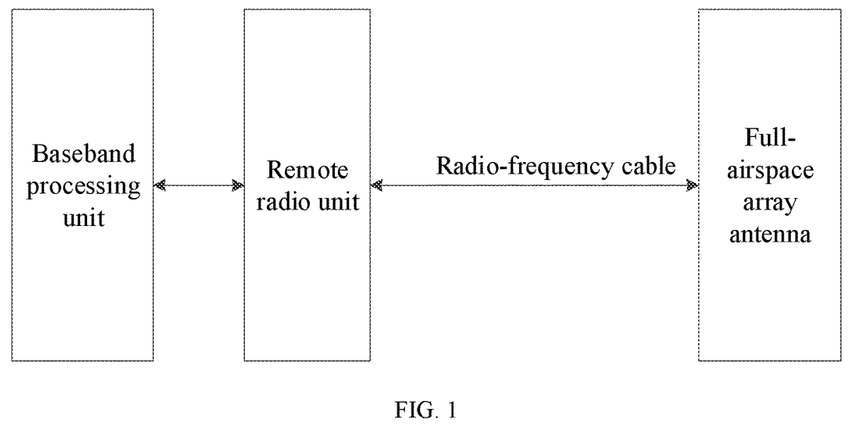
FIG. 1 is a block diagram showing the principle of the system of the present disclosure.
Figure 2:
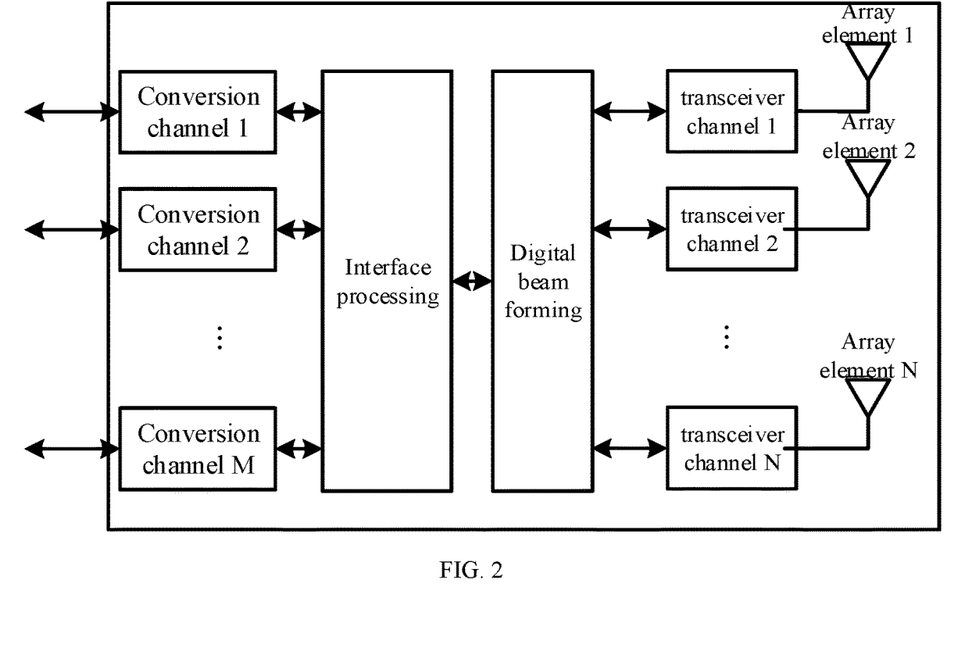
FIG. 2 is a schematic diagram showing the principle of the full-airspace array antenna.

As shown in FIG. 1 and FIG. 2, a system for enhancing an aerospace coverage capability of a mobile communication base station includes a baseband processing unit, a remote radio unit, and a full-airspace array antenna.

The full-airspace array antenna includes a conversion channel module, an interface processing module, a digital beamforming module, a transceiver channel module, and an antenna array. The transceiver channel module includes a plurality of transceiver channels, and the antenna array includes a plurality of antenna array elements which are in a one-to-one correspondence with the plurality of transceiver channels.

The baseband processing unit is connected to the remote radio unit, the remote radio unit is connected to the conversion channel module through a radio-frequency cable, and the conversion channel module is connected to the digital beamforming module through the interface processing module.

The conversion channel module is configured to realize the conversion between radio-frequency signals and digital signals. The interface processing module is configured to complete data aggregation and transmission between the conversion channel module and the digital beamforming module. The digital beamforming module is configured to adjust amplitude and phase weighting coefficients of each transceiver channel to form transmitting beams covering a specific spatial domain. The digital beamforming module is connected to a corresponding antenna array element through each transceiver channel.

In an embodiment of the present disclosure, the morphology of the full-airspace array antenna includes, but is not limited to, a spherical shape, a hemispherical shape, a combination of a hemispherical shape and a cylindrical shape, a polyhedral shape, a smooth curved surface, and a mesh curved surface spliced by polygons. In an embodiment of the present disclosure, the baseband processing unit and the radio remote unit are both off-the-shelf products of the existing mobile communication base station.

Figure 3:
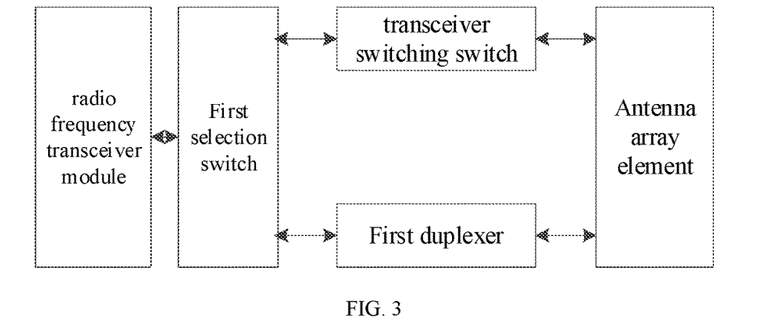
FIG. 3 is a schematic diagram showing the principle of the transceiver channel.

As shown in FIG. 3, each of the transceiver channels includes a radio-frequency transceiver module, a first selection switch, a transceiver switching switch, and a first duplexer. The digital beamforming module is connected to the radio-frequency transceiver module. The radio-frequency transceiver module is connected to the first selection switch. The first selection switch is connected to the transceiver switching switch and the first duplexer, respectively. The transceiver switching switch and the first duplexer are both connected to an antenna array element corresponding to the transceiver channel.

Figure 4:
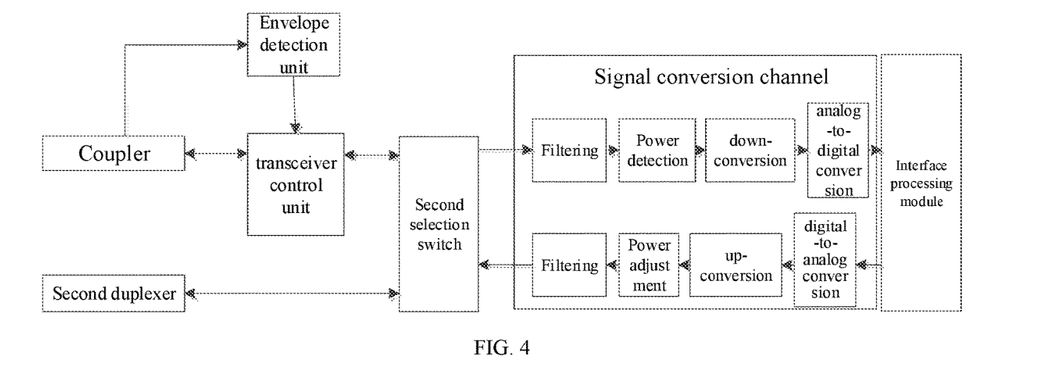
FIG. 4 is a schematic diagram showing the principle of the conversion channel.

The conversion channel module includes a plurality of conversion channels. The number of the plurality of conversion channels is the same as the number of channels of the radio remote unit, and the plurality of conversion channels and the channels of the radio remote unit are connected in one-to-one correspondence manner.

As shown in FIG. 4, the conversion channel includes a second duplexer, a coupler, a transceiver control unit, an envelope detection unit, a second selection switch, and a signal conversion channel.

One end of the signal conversion channel is connected to the interface processing module, and the other end of the signal conversion channel is connected to the second selection switch. The second selection switch is connected to the transceiver control unit and the second duplexer, respectively. The transceiver control unit is connected to the coupler. The second duplexer and the coupler are both connected to the remote radio unit.

The input end of the envelope detection unit is connected to the coupler, the envelope detection unit is configured to detect the transmitting and receiving time slots of the signal and transmit an inspection result to a transceiver controller, and the transceiver controller completes the receiving and transmitting switching control according to the inspection result.

Each signal conversion channel includes a first filtering unit, a first power detection unit, a first down-conversion unit, a first analog-to-digital conversion unit, a second filtering unit, a first power adjustment unit, a first up-conversion unit, and a first digital-to-analog conversion unit. The input end of the first filtering unit is connected to the transceiver control unit or the duplexer through the second selection switch. The output end of the first filtering unit is connected to the interface processing module successively through the first power detection unit, the first down-conversion unit and the first analog-to-digital conversion unit. The input end of the first digital-to-analog conversion unit is connected to the interface processing module. The output end of the first digital-to-analog conversion unit is connected to the second filtering unit successively through the first up-conversion unit and the first power adjustment unit. The output end of the second filtering unit is connected to the transceiver control unit or the duplexer through the second selection switch.

Figure 5:
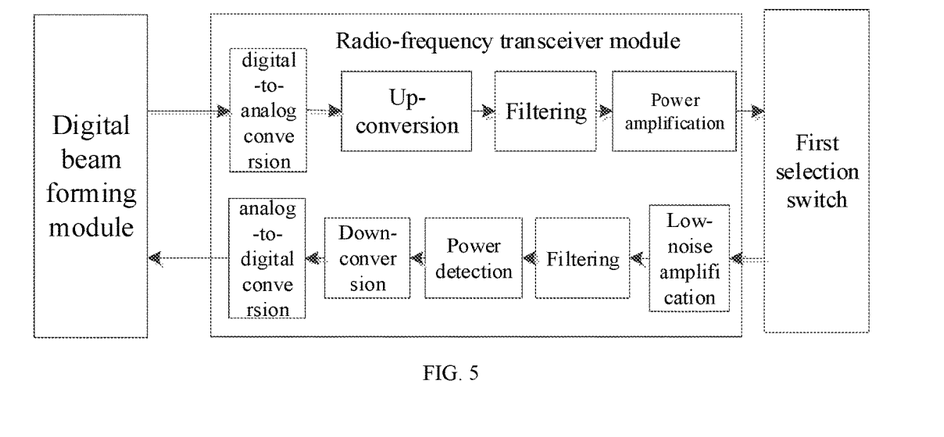
FIG. 5 is a schematic diagram of the principle of the radio-frequency transceiver module.

As shown in FIG. 5, each radio-frequency transceiver module includes a second digital-to-analog conversion unit, a second up-conversion unit, a third filtering unit, a power amplification unit, a low-noise amplification unit, a fourth filtering unit, a second power detection unit, a second down-conversion unit and a second analog-to-digital conversion unit. The input end of the second digital-to-analog conversion unit is connected to the digital beamforming module. The output end of the second digital-to-analog conversion unit is connected to the first selection switch successively through the second up-conversion unit, the third filtering unit and the power amplification unit.

The input end of the low-noise amplification unit is connected to the first selection switch. The output end of the low-noise amplification unit is connected to the digital beamforming module successively through the fourth filtering unit, the second power detection unit, the second down-conversion unit and the second analog-to-digital conversion unit.

The interface processing module includes a data transmission unit and a power control unit. The data transmission unit is configured to complete data aggregation and transmission between the conversion channel module and the digital beamforming module. The power control unit is configured to receive power information detected by the first power detection unit, and control the amplified power of the transceiver channel module according to the power information. Alternatively, the power control unit is configured to receive power information collected by the second power detection unit, and control the power adjustment in the conversion channel module according to the power information.

Figure 6:
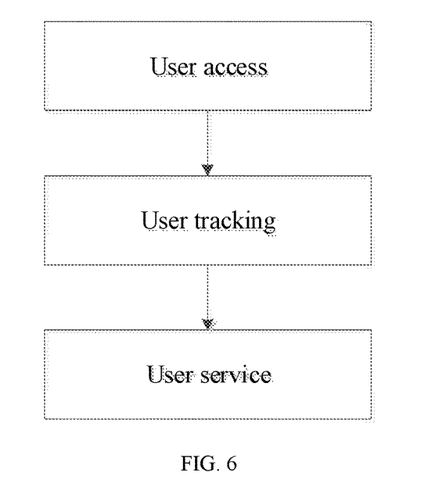
FIG. 6 is a flow chart showing the method of the present disclosure.

As shown in FIG. 6, a method for achieving aerospace coverage by the system for enhancing the aerospace coverage capability of the mobile communication base station includes a user access step, a user tracking step, and a user service step.

The user access step includes the following three modes.

First, in the external auxiliary access mode: when the position information of the user is obtained in an external manner, the full-airspace array antenna forms a directional beam pointing to the direction of the user based on the position information of the user to ensure reliable access of the user. For example, the position information of the user such as a flight path of a civil aircraft and a moving track of a satellite, is available in an external manner such as an air route map, ephemeris or a surveillance device.

Second, in a wide beam access mode: when the position information of the user is unavailable, the number of array elements participating in digital beamforming is reduced to form a wide beam with a wider beam width to cover the user and achieve reliable access of the user.

Third, in a narrow beam access mode: when the number of array elements participating in the digital beamforming is constant, the full-airspace array antenna forms a narrow beam with a narrower beam width to realize beam scanning. In an embodiment of the present disclosure, since the full-airspace array antenna is an active phased array antenna, the digital beamforming can be employed to conveniently implement the beam scanning. Therefore, narrow beams covering different beam positions can be formed at different times to achieve full-airspace scanning for random access of the user, and a sufficient residence time of the beam position can ensure reliable access of the user.

The user tracking step includes the following two modes:

First, in an angle tracking mode: the system uses multi-beam capability of the full-airspace array antenna to allocate a beam, and adjusts the direction of the beam in real time based on the angle tracking to achieve tracking of a user, thereby ensuring stable service transmission of the user.

Second, in an external auxiliary tracking mode: the position information of a user equipped with a satellite positioning receiver such as a global positioning system (GPS) or BeiDou positioning system, is reported to the system during an access phase, and the system uses the position information of the user to achieve beam-oriented tracking coverage.

Figure 7:
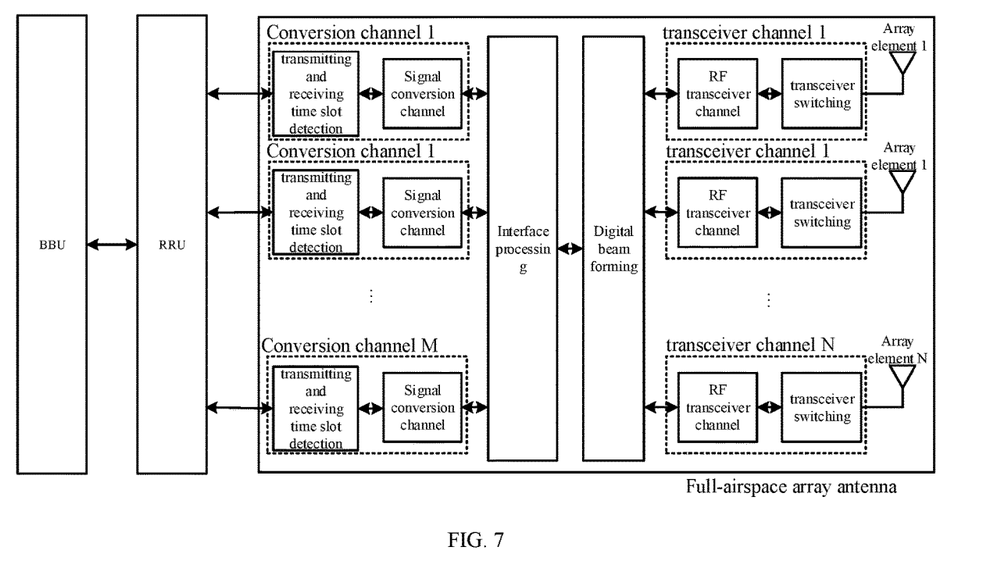
FIG. 7 is a schematic diagram showing the principle of the system in a time division duplexing (TDD) working scenario.

The user service step includes the following two scenarios:

In a TDD working scenario, the first selection switch is controlled to connect the radio-frequency transceiver module to the transceiver switching switch, and the second selection switch is controlled to connect the signal conversion channel to the transceiver control unit. As shown in FIG. 7, the output signal of the remote radio unit is coupled and sent to the envelope detection unit, and the size of the envelope signal is detected. If the size of the envelope signal is greater than a threshold, the size of the envelope signal is a transmitting time slot; if the size of the envelope signal is less than the threshold, the size of the envelope signal is a receiving time slot.

If the size of the envelope signal is detected to be the transmitting time slot, the output signal of the remote radio unit is filtered, power detected, down-converted, and analog-to-digital converted by the conversion channel to obtain an original baseband sending signal and transmit the original baseband sending signal to the interface processing module. The interface processing module completes data aggregation and distributes the data to the digital beamforming module. The digital beamforming module adjusts the amplitude and phase weighting coefficients of each channel to form transmitting beams covering a specific spatial domain. After the amplitude and phase of the baseband signals of respective channels are adjusted, the baseband signals of respective channels complete the digital-to-analog conversion, up-conversion, filtering through the transceiver channel and perform signal amplification based on a power detection value, and are radiated through an array element under the control of the transceiver switching switch.

If the size of the envelope signal is detected to be the receiving time slot, the signals received by each antenna array element are amplified, filtered, power detected, down-converted, and analog-to-digital converted by the transceiver channel and then are input into the digital beamforming module under the control of the transceiver switching switch. The digital beamforming module adjusts amplitude and phase weighting coefficients of each channel to form receiving beams covering a specific spatial domain. The interface processing module aggregates and distributes the beamformed receiving signals to the conversion channel module. The conversion channel module performs digital-to-analog conversion, up-conversion, filtering, and radio-frequency signal power adjustment based on the power detection value to obtain and transmit the radio-frequency receiving signal to the radio remote unit.

Figure 8:
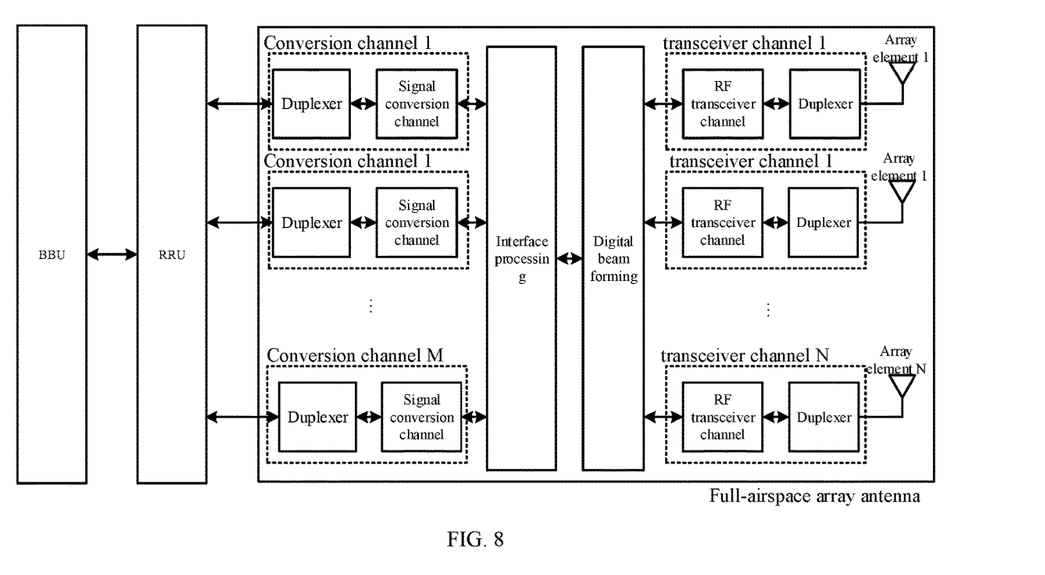
FIG. 8 is a schematic diagram showing the principle of the system in a frequency division duplexing (FDD) working scenario.

In the FDD working scenario, as shown in FIG. 8, the first selection switch is controlled to connect the radio-frequency transceiver module to the first duplexer, and the second selection switch is controlled to connect the signal conversion channel to the second duplexer.

The duplexer in the conversion channel separates the transmitting and receiving signals, and for the transmitting signal, the output signal of the remote radio unit is output to the conversion channel through the duplexer. The output signal of the remote radio unit is filtered, power detected, down-converted, and analog-to-digital converted by the conversion channel to obtain an original baseband sending signal and transmit the original baseband sending signal to the interface processing module. The interface processing module completes data aggregation and distributes the data to the digital beamforming module. The digital beamforming module adjusts amplitude and phase weighting coefficients of each channel to form transmitting beams covering a specific spatial domain. After the amplitude and phase of the baseband signals of respective channels are adjusted, the baseband signals of respective channels complete the digital-to-analog conversion, up-conversion, filtering through the transceiver channel and perform signal amplification based on a power detection value, and are radiated through an array element after passing through the duplexer.

For the receiving signal, the signal received by each antenna array element enters each transceiver channel through the duplexer to be amplified, filtered, power detected, down-converted, and analog-to-digital converted, and then is input into the digital beamforming module. The digital beamforming module adjusts amplitude and phase weighting coefficients of each channel to form the receiving beams covering a specific spatial domain. The interface processing module aggregates and distributes the beamformed receiving signals to the conversion channel module. The conversion channel module performs digital-to-analog conversion, up-conversion, filtering, and radio-frequency signal power adjustment based on the power detection value to obtain a radio-frequency receiving signal and transmit the radio-frequency receiving signal to the radio remote unit through the duplexer.

The TDD working scenario and the FDD working scenario both include the following two working modes.

First, in the single stream mode:

the baseband processing unit and the remote radio unit are configured to work in a single antenna mode, at this time, the baseband processing unit processes a single data stream, the remote radio unit works with only one channel. When transmitting, the full-airspace array antenna receives a single radio-frequency signal output by the remote radio unit, parses out a single baseband data stream, and forms a digital beam through digital beamforming to achieve aerospace coverage; when receiving, the full-airspace array antenna forms a digital beam through digital beamforming to achieve the aerospace coverage, receives a user signal, parses out a single baseband data stream, and restores the single baseband data stream into the radio-frequency signal and outputs the radio-frequency signal to the remote radio unit.

Second, in a multi-stream mode:

the baseband processing unit and the remote radio unit are configured to work in a multi-antenna mode and realize multi-antenna space division multiplexing through the codebook design, at this time, the baseband processing unit simultaneously processes L data streams, each data stream carries data of different users, data of the same user only exists in one data stream, and the remote radio unit simultaneously performs frequency conversion on L channels; when transmitting, the full-airspace array antenna receives L radio-frequency signals output by the remote radio unit and parses out L baseband data streams, and then forms L digital beams through digital beamforming, so as to realize the transmission of user data in L spatial domains; when receiving, the full-airspace array antenna forms L digital beams through digital beamforming to cover users in the L spatial domains, receives signals of the user, parses out L baseband data streams, and restores the L baseband data streams into L radio-frequency signals and outputs the L radio-frequency signals to the remote radio unit. Herein, the increase in system capacity brought by the multi-antenna space division multiplexing reflects in the increase in the number of accessed users in the aerospace rather than the increase in the data transmission rate of a single user.

Figure 9:
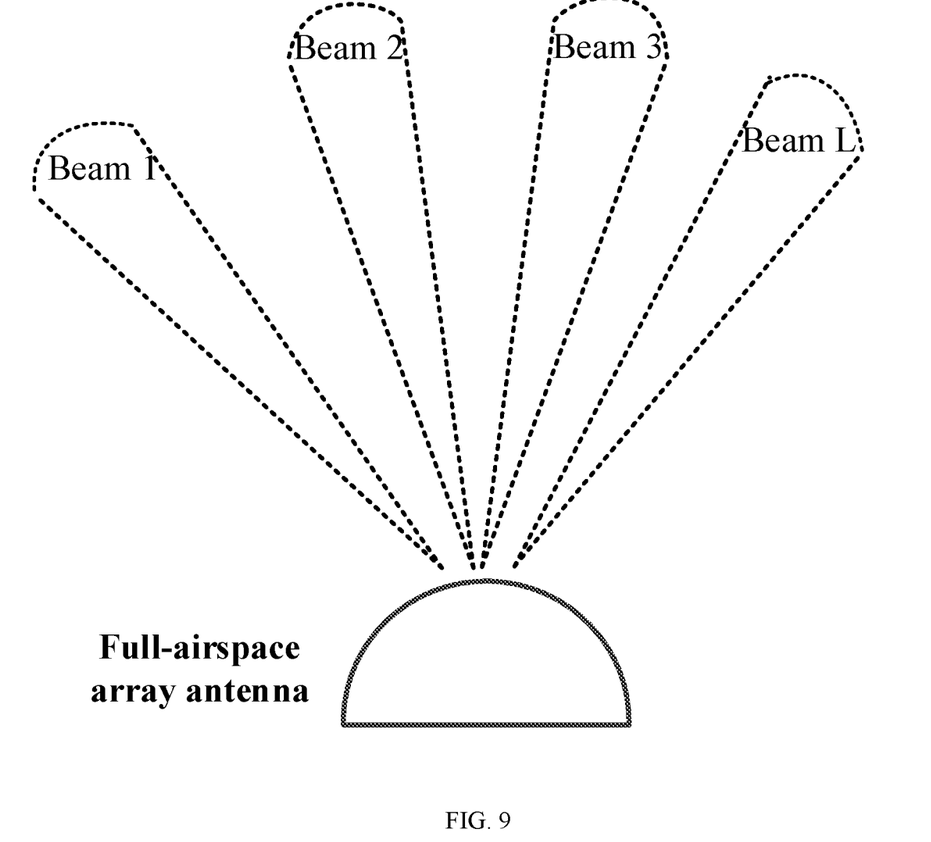
FIG. 9 is a schematic diagram showing the aerospace coverage of a plurality of digital beams of the full-airspace array antenna according to an embodiment.

As shown in FIG. 9, the full-airspace array antenna can use digital multi-beamforming technology to simultaneously form a plurality of digital beams to improve the aerospace coverage. The power detection is used for determining whether there is a user uplink signal in a certain beam, if there is no user uplink signal in the beam, the signal of the beam does not participate in the beam superposition to avoid introducing additional noise.

Based on the existing mobile communication base station, in the present disclosure, the full-airspace array antenna is appropriately configured to replace the existing antenna to achieve the coverage and access of user terminals in a spatial domain, which effectively enhances the aerospace coverage capability of the communication system. In the full-airspace array antenna, the channel conversion module is configured to complete the conversion of radio-frequency signals and digital signals. Therefore, the full-airspace array antenna can be directly connected to the radio remote unit of the existing base station, to ensure the compatibility between the full-airspace array antenna and the remote radio unit of the existing base station. In the single stream mode of the present disclosure, the high-gain narrow beam and the digital multi-beamforming technology are employed to improve the coverage of the system, and in the multi-stream mode, the multiple-antenna space-division multiplexing is employed to improve the number of accessed users in the aerospace.

It should be noted that the foregoing descriptions are only the preferred embodiments of the present disclosure and are not intended to limit the present disclosure. Although the present disclosure has been described in detail with reference to the foregoing embodiments, those skilled in the art can still make several modifications to the technical solutions described in the foregoing embodiments, or make equivalent replacements to some technical features thereof. For example, the division of the module is a logical functional division method, and other division methods can also be used in the actual implementation, which can be combined or separated, or some features can be ignored or not implemented. The division of the module can be implemented by hardware or software functional units. Any modifications, equivalent replacements, improvements and the like made within the spirit and principle of the present disclosure shall fall within the scope of protection of the present disclosure.

What is claimed is:

1. A system for enhancing an aerospace coverage capability of a mobile communication base station, the system comprising:
    a baseband processing circuit,
    a remote radio circuit, and
    a full-airspace array antenna;
    wherein
    the full-airspace array antenna comprises a conversion channel circuit, an interface processing circuit, a digital beamforming circuit, a transceiver channel circuit, and an antenna array;
    the transceiver channel circuit comprises a plurality of transceiver channels, and the antenna array comprises a plurality of antenna array elements, wherein the plurality of antenna array elements is in a one-to-one correspondence with the plurality of transceiver channels;
    the baseband processing circuit is connected to the remote radio circuit, the remote radio circuit is connected to the conversion channel circuit through a radio-frequency cable, and the conversion channel circuit is connected to the digital beamforming circuit through the interface processing circuit; and
    the conversion channel circuit is configured to realize a conversion between a radio-frequency signal and a digital signal; the interface processing circuit is configured to complete data aggregation and transmission between the conversion channel circuit and the digital beamforming circuit; the digital beamforming circuit is configured to adjust an amplitude and phase weighting coefficient of each transceiver channel of the plurality of transceiver channels to form transmitting beams covering a spatial domain; and the digital beamforming circuit is connected to each antenna array element of the plurality of antenna array elements through each of the transceiver channels, wherein each of the antenna array elements corresponds to each of the transceiver channels;
    wherein the full-airspace array antenna is configured to perform a user access step comprising:
        in an external auxiliary access mode, when position information of a user is obtained in an external manner, forming a directional beam pointing to a direction of the user based on the position information of the user via the full-airspace array antenna to ensure reliable access of the user;
        in a wide beam access mode, reducing, when the position information of the user is unavailable, a number of antenna array elements of the plurality of antenna array elements, to form a wide beam with a wider beam width to cover the user and achieve the reliable access of the user, wherein the number of antenna array elements of the plurality of antenna array elements participates in digital beamforming; and
        in a narrow beam access mode, forming, when the number of the number of antenna array elements participating in the digital beamforming is constant, a narrow beam with a narrower beam width to achieve beam scanning via the full-airspace array antenna, and forming narrow beams covering different beam positions at different times to achieve full-airspace scanning and random access of the user.

2. The system for enhancing the aerospace coverage capability of the mobile communication base station according to claim 1, wherein, a morphology of the full-airspace array antenna comprises a spherical shape, a hemispherical shape, a combination of the hemispherical shape and a cylindrical shape, a polyhedral shape, a smooth curved surface, and a mesh curved surface spliced by polygons.

3. The system for enhancing the aerospace coverage capability of the mobile communication base station according to claim 1, wherein the full-airspace array antenna is further configured to perform:
    a user tracking step, comprising:
        in an angle tracking mode, using a multi-beam capability of the full-airspace array antenna to allocate a beam by the system, and adjusting a direction of the beam in real time based on angle tracking, to achieve tracking of the user and ensure stable service transmission of the user; and
        in an external auxiliary tracking mode, reporting position information of the user equipped with a satellite positioning receiver to the system during an access phase, wherein the system uses the position information of the user equipped with the satellite positioning receiver to achieve beam-oriented tracking coverage; and
    a user service step, comprising:
        in a single stream mode,
            configuring the baseband processing circuit and the remote radio circuit to work in a single antenna mode, wherein the baseband processing circuit processes a single data stream, and the remote radio circuit works with only one transceiver channel of the plurality of transceiver channels;
            when transmitting, the full-airspace array antenna receives a first single radio-frequency signal output by the remote radio circuit, parses out a first single baseband data stream, and forms a digital beam through digital beamforming to achieve aerospace coverage; and
            when receiving, the full-airspace array antenna forms the digital beam through the digital beamforming to achieve the aerospace coverage, the full-airspace array antenna receives a signal of the user, parses out a second single baseband data stream, restores the second single baseband data stream into a second single radio-frequency signal, and outputs the second single radio-frequency signal to the remote radio circuit; and in a multi-stream mode, configuring the baseband processing circuit and the remote radio circuit to work in a multi-antenna mode and realize multi-antenna space division multiplexing through codebook design, wherein the baseband processing circuit simultaneously processes L data streams, and each data stream of the L data streams carries data of a plurality of users, data of a user of the plurality of users only exists in one data stream of the L data streams, and the remote radio circuit simultaneously performs a frequency conversion on L transceiver channels of the plurality of transceiver channels;

when transmitting, the full-airspace array antenna receives first L radio-frequency signals output by the remote radio circuit, parses out first L baseband data streams, and then forms L digital beams through the digital beamforming, to realize transmission of the data of the plurality of users in L spatial domains; and when receiving, the full-airspace array antenna forms the L digital beams through the digital beamforming to cover the plurality of users in the L spatial domains, receives signals of the plurality of users in the L spatial domains, parses out second L baseband data streams, restores the second L baseband data streams into second L radio-frequency signals, and outputs the second L radio-frequency signals to the remote radio circuit, wherein L is an integer greater than 1.

4. The system for enhancing the aerospace coverage capability of the mobile communication base station according to claim 3, wherein, a morphology of the full-airspace array antenna comprises a spherical shape, a hemispherical shape, a combination of the hemispherical shape and a cylindrical shape, a polyhedral shape, a smooth curved surface, and a mesh curved surface spliced by polygons.

* * * * *